United States Patent [19]

Kuwabara et al.

[11] 4,303,370

[45] Dec. 1, 1981

[54] CONTROL APPARATUS AND METHOD OF OPERATING THE SAME

[75] Inventors: Takao Kuwabara; Hisaya Uchiyama; Hiroshi Okumura, all of Hitachi, Japan

[73] Assignee: Hitachi, Ltd., Tokyo, Japan

[21] Appl. No.: 34,603

[22] Filed: Apr. 30, 1979

[30] Foreign Application Priority Data

Apr. 29, 1978 [JP] Japan ............................ 53/52094

[51] Int. Cl.³ .......................................... F01B 25/00
[52] U.S. Cl. ................................. 415/17; 415/22
[58] Field of Search ....................... 415/1, 17, 22, 39

[56] References Cited

U.S. PATENT DOCUMENTS

| | | | |
|---|---|---|---|
| 1,309,808 | 7/1919 | Pfau | 415/39 |
| 2,343,223 | 2/1944 | Pfau et al. | 415/17 |
| 2,938,527 | 5/1960 | Nichols | 415/39 |
| 4,097,183 | 6/1978 | Namikas et al. | 415/1 |

Primary Examiner—Louis J. Casaregola
Attorney, Agent, or Firm—Thomas E. Beall, Jr.

[57] ABSTRACT

A control apparatus comprises a primary control unit composed of wicket gates of a hydraulic turbine and a secondary control unit composed of a bypass valve which is operated to open or close in cooperation with the opening or closing of the wicket gates. First and second link mechanisms are provided between the wicket gates and a hydraulic pressure distributor valve which is operatively connected to the bypass valve to control opening or closing of the latter. The first link mechanism detects the opening or closing motion of the wicket gates and transmits the corresponding signal to the hydraulic pressure distributor valve for the bypass valve, while the second link mechanism detect position of a pressure distributor valve plunger for the wicket gates and transmits the corresponding signal to the distributor valve for the bypass valve. A reset cylinder contains a piston which is connected to the second link mechanism and is operated by a solenoid valve to reset the last-mentioned signal when the wicket gates are held stationary in the fully closed position.

18 Claims, 3 Drawing Figures

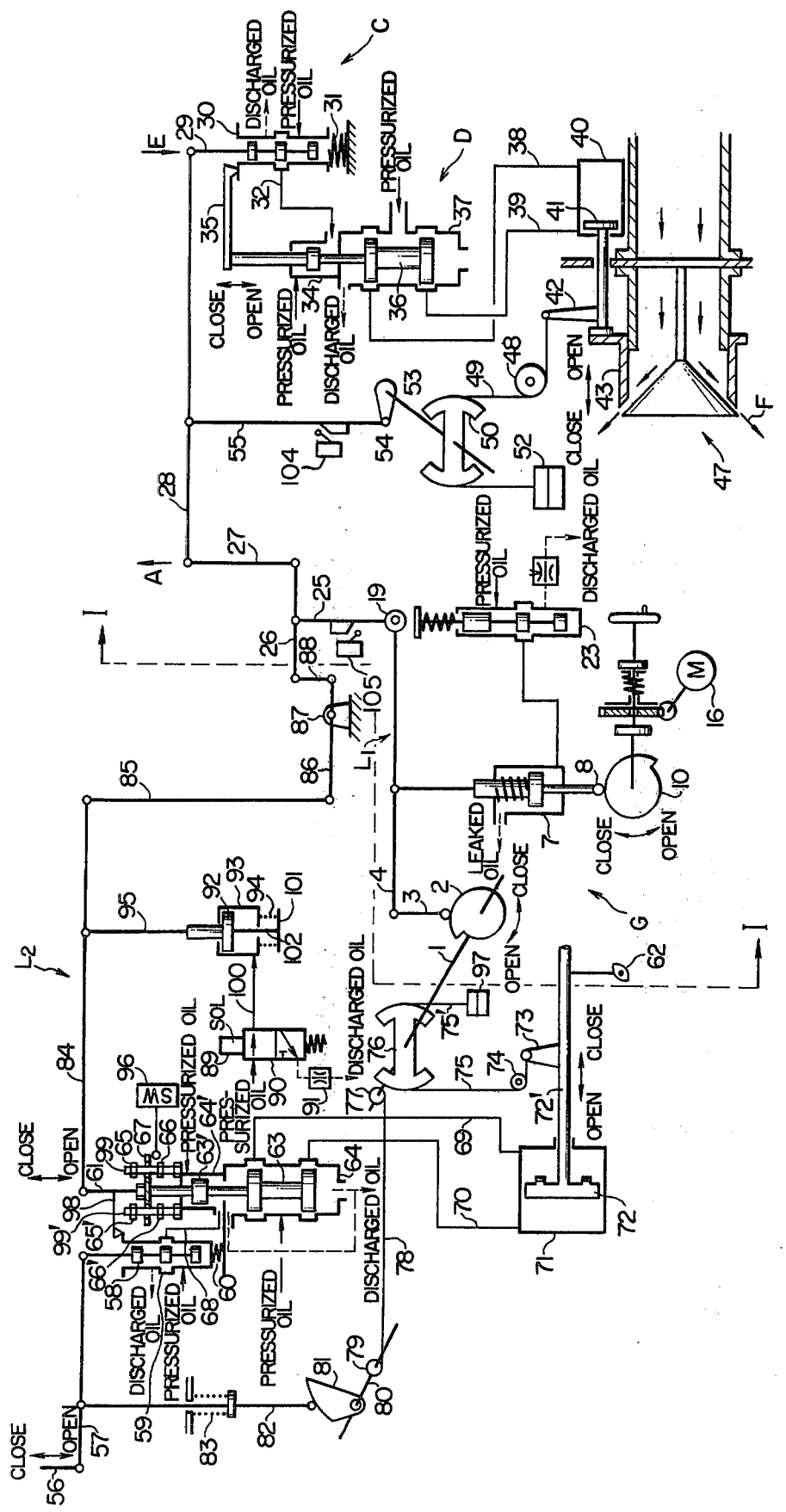

CONTROL APPARATUS AND METHOD OF OPERATING THE SAME

BACKGROUND OF THE INVENTION

The present invention relates to a control apparatus of the type which includes a primary control unit capable of taking variable operative positions and a secondary control unit operable in accordance with the operative positions of the primary control unit, and a method of controlling the operation of such control apparatus.

The control apparatus including the primary control unit and the secondary control unit has been used in the various technical fields. For example, U.S. Pat. No. 4,097,183 discloses a hydraulic system which comprises a primary control unit including wicket gates of a water turbine and a secondary control unit including a bypass valve. In this hydraulic system, the bypass valve is controlled to open or close in an interlocked relation with the wicket gates in order to bypass a stream of water with respect to the turbine in accordance with the opening or closing action of the wicket gates, thereby maintaining total water flow through the penstock constant in each transient state of the wicket gate motion and minimizing the resultant water pressure changes in the penstocks. The system includes signal transmitting means which detects the position of the wicket gates and transmitting the corresponding signal to the bypass valve to control the latter. In this system, it is apparently preferable that the follow-up characteristics of the operation of the bypass valve responsive to the position of the wicket gates can be improved.

As a measure to improve the follow-up characteristics, it is conceivable to control the bypass valve by transmitting thereto a differential signal of the opening and closing motions of the wicket gates in addition to the position signal of the wicket gates.

More practically, it is conceivable to control the bypass valve by a combined signal of the wicket gate responsive signal and a signal responsive to position of the pressure distributor valve for the wicket gates. However, in such practical design, the distributor valve responsive signal does not always represent the desired differential signal of the wicket gates since there are some hydraulical or mechanical restricting means between the wicket gate distributor valve and the wicket gate driving servo-motor.

SUMMARY OF THE INVENTION

It is therefore an object of the invention to provide a control apparatus of the type described, which assures improved follow-up characteristics of the secondary control unit responsive to the primary control unit without adversely affecting the other characteristics of the apparatus.

It is another object of the invention to provide a control apparatus which is designed to transmit the differential signal derived from an intermediate control process of the primary control unit to the secondary control unit and to automatically modify the latter differential signal when desired.

It is a further object of the invention to provide a control apparatus particularly suitable for use with a hydraulic turbine system for controlling the bypass flow responsive to the opening and closing of the wicket gates of the turbine.

It is a still further object of the invention to provide an improved method of controlling the operation of the control apparatus of the above-discussed type including the primary and secondary control units.

According to one aspect of the invention, a control apparatus comprises first signal transmitting means for detecting the operative position of a primary control unit and transmitting the corresponding positional signal to a secondary control unit, second signal transmitting means for detecting the differential value of the operative position of the primary control unit at an intermediate process of amplification or command signal yielding or generating process and transmitting the corresponding differential signal to the secondary control unit, and means for automatically resetting the differential signal when it is detected that the primary control unit is held stationary in a predetermined operative position.

According to another aspect of the invention, a method of controlling the operation of a control apparatus comprises, detecting the operative position of a primary control unit and transmitting the corresponding positional signal to a secondary control unit, detecting and deriving the differential value of the operative position of the primary control unit from the final output servo-motor end of the control unit and transmitting the corresponding differential signal to the secondary control unit, without necessitating any automatic resetting means for the differential signal even when the motion of the final stage servo-motor of the primary control unit is restricted hydraulically or mechanically.

The foregoing objects and other objects as well as the characteristic features of the invention will become more apparent and understandable by the following description with reference to the accompanying drawings.

BRIEF DESCRIPTION OF THE DRAWINGS

FIG. 2 is a diagrammatic view showing a control apparatus for a water turbine system according to an embodiment of the invention.

DETAILED DESCRIPTION OF THE PREFERRED EMBODIMENT

Figure 1:
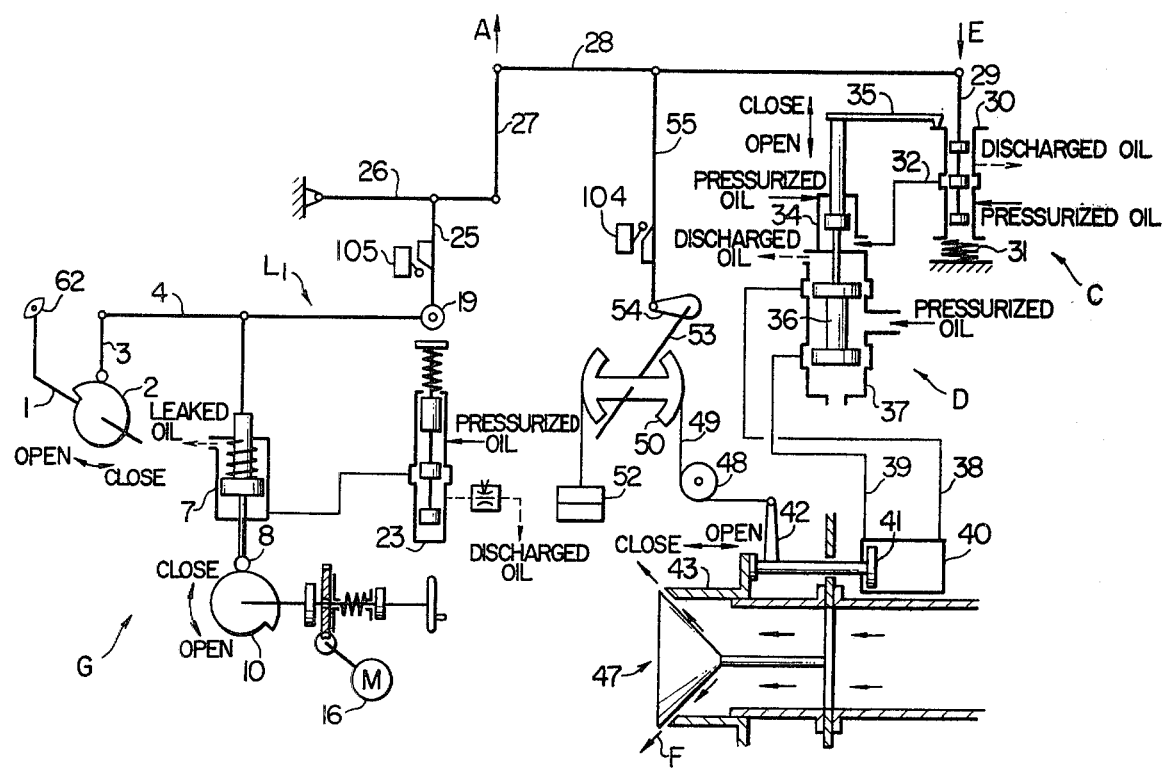
FIG. 1 is a diagrammatic view showing a prior art control apparatus for a water turbine system.

FIG. 2 illustrates a control apparatus for a water turbine system according to an embodiment of the invention which improves a prior art control apparatus shown in FIG. 1. It is to be noted that the apparatus of FIG. 1 corresponds to an apparatus disclosed in FIG. 1 of the U.S. Pat. No. 4,097,183. Before entering into description of the control apparatus shown in FIG. 2, the apparatus of FIG. 1 will be described briefly so as to promote the understanding of the invention.

Referring to FIG. 1 which shows prior art control apparatus for the water turbine system, a primary control unit is composed of wicket gates 62 which are mounted on a shaft 1 and adapted to be controlled by a governor not shown to open or close. The shaft 1 is rotated together with a cam 2 in cooperation with the opening or closing action of the wicket gates 62, and the rotational movement of the cam 2 is changed to upward or downward movement of the left end of a horizontal lever 28, through a link mechanism L₁ including cam follower 3, horizontal lever 4, link 25, horizontal lever 26 and link 27. When the wicket gates 62 are moved toward their closed position and thus the cam 2 is rotated in the counter-clockwise direction, the left end of the lever 4 is lowered to move a roller 19 mounted on the right end of the lever 4 upwardly, which in turn causes the upward movement as shown by an arrow A of the left end of the lever 28. It will be understood that the abovementioned link mechanism $L_1$ serves as a mechanism for detecting the opening or closing action of the wicket gates 62 and transmitting the corresponding signal to the lever 28 which is connected at its right end to a plunger 29 of an oil pressure distributor valve C. The valve C is hydraulically connected through a line 32 with a main oil pressure distributor valve D, and the latter valve D in turn is operatively connected with a secondary control unit composed of a bypass valve 47.

When the wicket gates 62 are moved toward their closed position and thus the left end of the lever 28 is moved upwardly as shown by the arrow A, the right end of the lever 28 is moved downwardly as shown by an arrow E. The downward movement E of the right end of the lever 28 causes the downward movement of the plunger 29 within a sleeve 30 of the distributor valve C, thereby causing the oil discharge from the underside of a pilot cylinder 34 of the valve D, through the line 32, to the discharge side of the valve C. Thus, a plunger 36 of the distributor valve D is moved downwardly in a cylinder 37. With the downward movement of the plunger 36, a pressure oil is introduced through a line 39 into a left chamber in a servo motor 40 to move a sleeve 43 of the bypass valve 47 while causing the pressure oil discharge from a right chamber in the servo motor 40, through a line 38, and valve D, to the discharge side of the valve D. Consequently, a stream of water F flowing through the bypass valve 47 is increased.

The downward movement of the plunger 36 is followed by the lowering of a return arm 35, which forces down the sleeve 30 against a force of a spring 31. As a result, the relative displacement between the sleeve 30 and the plunger 29 occurs to isolate the oil line 32 from the discharge side of the distributor valve C. When the oil line 32 is isolated from the discharge side of the distributor valve C, the sleeve 30 is no longer forced down by the arm 35 and thus stops its downward movement. Downward movement and stopping of the sleeve 30 successively take place resulting in repeated stepwise lowering of the sleeve 30.

Movement in the opening direction of the sleeve 43 of the bypass valve 47 is transmitted through associated members such as return post 42, pulley 48, wire 49, return sheave 50, counter weight 52, shaft 53 and lever 54 to permit a link 55 to be raised and subsequently to permit the right end of the lever 28 to be moved upwardly thereby raising the plunger 29. As a result, the plunger 29 which has been lowered by the closing action of the wicket gates 62 is returned to its original position by the opening operation of the bypass valve 47. Opening degree of the bypass valve 47 is thus determined dependent upon the closing degree of the wicket gates 62.

It will be understood that, when the wicket gates 62 are moved toward their opened position, the sleeve 43 of the bypass valve 47 is moved toward the left to reduce the water flow F, in the reversed manner from the above-described operation of the apparatus in which the wicket gates 62 are moved toward their closed position.

As will be understood from the foregoing, the opening degree of the bypass valve 47 is controlled responsive to the opening degree of the wicket gates 62. This opening degree control of the bypass valve 47 is effected to maintain the sum of the flow rate of water passing through the wicket gates 62 and the flow rate of water released from the bypass valve 47 at a constant rate, so as to prevent occurrence of for example a disadvantageous water hammer in the penstock and draft tube, thereby assuring stable operation of the water turbine.

The control apparatus shown in FIG. 1 is operable in a different mode from the above described operation mode, because of, the provision of for example, limit switches 104, 105 operatively associated with a motor 16, and a control device G including bias cylinder 7, bias cam 10 and oil pressure distributor valve 23. For example, it is operable to slowly close the bypass valve 47, thereby preventing wasteful consumption of available water, after stable operation of the bypass valve is reached to have the opening degree reflecting the opening degree of the wicket gates and thus the opening or closing action of the bypass valve responsive to the opening or closing action of the wicket gates is terminated.

Further description on the control apparatus shown in FIG. 1 is eliminated since the apparatus is fully described in the Specification of the U.S. Pat. No. 4,097,183.

Next, referring to FIG. 2, the control apparatus according to an embodiment of the invention is illustrated. This control apparatus has a right-half section indicated by dotted arrows I—I which comprises a primary control unit composed of wicket gates 62, link mechanism $L_1$ for a signal transmission including cam follower 3, horizontal lever 4, link 25, horizontal lever 26 and link 27, and secondary control unit composed of a bypass valve 47. The apparatus section I—I is substantially identical in structure with the prior art control apparatus described hereinbefore with reference to FIG. 1, so that further description on this section I—I is eliminated. Of course same parts are designated by same reference numerals in both FIGS. 1 and 2. It is to be noted that the left end of the lever 26 of the apparatus shown in FIG. 2 is connected to a link 88, in contrast with the lever 26 of FIG. 1 which has the left end pivotally connected to a fixed member.

Referring to a left-half section of FIG. 2 which illustrates an improved structural feature of the control apparatus, a horizontal lever 57 has a left end connected to a lower end of a link 56 and a right end connected to a plunger 58. The left end of the lever 57 is controlled to move upwardly or downwardly through the link 56 which has an upper end operatively connected to a governor or like member not shown. The plunger 58 constitutes an oil pressure distributor valve together with a sleeve 59 for containing the plunger 58 and a spring 60 continuously biasing the sleeve 59 in an upward direction. As illustrated, the sleeve 59 is provided with an inlet connection for pressurized oil and a discharge connection for return oil. The oil pressure distributor valve is connected to a pilot valve cylinder 64' of a main oil pressure distributor valve 64 through an oil connection 68. This oil connection 68 supplies pressurized oil into the lower part of the cylinder 64' by the changeover action induced by the upward movement of the plunger 58 or the downward movement of the sleeve 59. Reference numeral 63' designates a piston disposed in the pilot valve cylinder 64', which piston is integrally connected to a plunger 63 of the main oil pressure distributor valve 64. As similar to the sleeve 59, the main oil pressure distributor valve 64 is provided with an inlet connection for pressurized oil and a discharge connection for return oil. Reference numerals 99 and 99' designate screw rods fixed to the cylinder 64'. Nuts 65 and 65' for adjusting the maximum possible opening speed of the wicket gates 62 are screw fitted on the upper positions of the respective screw rods 99 and 99'. Similarly, nuts 66 and 66' for adjusting the maximum possible closing speed of the wicket gates are screw fitted on the lower portions of the respective screw rods 99 and 99'. Further, reference numerals 67 and 96 designate a stopper and a limit switch, respectively.

The main oil pressure distributor valve 64 is continuously supplied with pressurized oil which is directed into oil lines or tubes 69 and 70 by the reciprocal movement of the plunger 63. A servo cylinder 71 contains a piston 72 which is reciprocatively moved by the action of pressurized oil fed through the oil tubes 69 and 70. It is to be noted that the wicket gates 62 are closed when a piston rod 72' integrally connected to the piston 72 is moved toward the right, while they are opened when the rod 72' is moved toward the left.

The reciprocatory movement of the piston 72 is also transmitted to a return sheave 76 through a pulley 74 and a length of wire 75 which connects the return sheave 76 with a return post 73 secured to the piston rod 72'. Another length of wire 75' is connected to the other side of the return sheave 76 and has a counter weight 97 attached thereto. The return sheave 76 is mounted on the shaft 1 for rotation therewith. The shaft 1 is connected with a return shaft 80 through a pulley 77 integrally mounted on the shaft 1, a length of wire 78, and a pulley 79 integrally mounted on the return shaft 80, so as to permit transmission of rotational movement from the shaft 1 to the return shaft 80. On the return shaft 80 is integrally mounted a return cam 81 which is engaged by a cam follower provided at the lower end of a link 82. The link 82 is continuously biased downwardly toward the return cam 81 by a spring 83, and has an upper end connected to an intermediate portion of the lever 57.

The piston 63' of the main oil pressure distributor valve 64 is connected at its upper end to a link mechanism $L_2$ which includes link 61, horizontal lever 84 having a left end connected to an upper end of the link 61, link 85 having an upper end connected to a right end of the lever 84, horizontal lever 86 having a left end connected to a lower end of the link 85, and the link 88 having a lower end connected to a right end of the lever 86 and an upper end connected to the left end of the horizontal lever 26. The lever 86 is pivotally connected to a fixed member 87 at an intermediate portion thereof. The link mechanism $L_2$ serves as means for transmitting a differential signal to the horizontal lever 28 in the apparatus section I-I, as will be described hereinafter.

Reference numeral 90 designates a solenoid valve including a solenoid 89. The solenoid valve 90 is hydraulically connected with a chamber defined in a reset cylinder 93 at the underside of the piston 92 which is disposed in the cylinder 93. The cylinder 93 is fixed immovably, and the piston 92 is constantly biased in the downward direction by a spring 94 mounted between the bottom surface of the cylinder 93 and a plate 101 connected to the bottom end of the piston 92 through a rod 102. The piston 92 is connected at its upper end through link 95 to an intermediate portion of the lever 84. While the solenoid 89 is energized, the underside chamber in the cylinder 93 is filled with pressurized oil which is fed through an oil line 100, so that the piston 92 is maintained in the upward position as illustrated. When the solenoid 89 is de-energized, the pressurized oil is discharged from the underside chamber in the cylinder 93 to an oil pan not shown through the oil line 100, solenoid valve 90 and a throttle valve 91.

Figure 3:
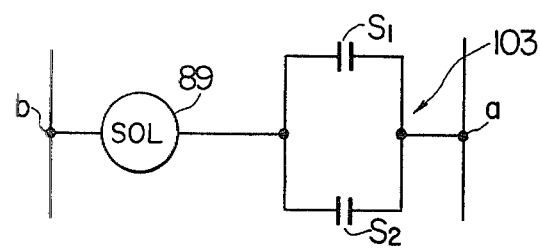
FIG. 3 is a schematic view showing the electrical connection between a solenoid and a switch circuit which control a solenoid valve of a reset means.

FIG. 3 illustrates an example of an electric circuit for energizing and de-energizing the solenoid valve 90. In the illustrated electric circuit, the solenoid 89 is connected in series with a switch circuit 103 including a first switch $S_1$ and a second switch $S_2$ connected in parallel with each other. The first switch $S_1$ is set to be normally closed and to open only when it is detected that the wicket gates 62 are in their fully closed position, while the second switch $S_2$ is set to be normally closed and to open only when it is detected that the plunger 63 of the main oil pressure distributor valve 64 is lowered below a neutral position as illustrated. Right and left end terminals a and b are connected to an electric power supply. It will be understood that the solenoid valve 90 is de-energized only when both of the contacts $S_1$ and $S_2$ are opened and thus the electrical connection between the solenoid 89 and the switch circuit 103 is interrupted.

Now, operation of the control apparatus as shown in FIG. 2 will be described. When a load applied on the water-turbine is decreased and input signal for moving the wicket gates 62 toward their closed position is transmitted to the link 56, the link 56 and thus the left end of the horizontal lever 57 are moved upwardly to cause the right end of the horizontal lever 57 to move downwardly. The plunger 58 is thus lowered from the illustrated neutral position and the oil connection 68 releases oil pressure from the underside of the pilot valve cylinder 64'. At the same time, pressurized oil on top of the cylinder 64' lowers from the illustrated neutral position the piston 63' together with the plunger 63. Thus, pressurized oil contained in the main oil pressure distributor valve 64 is passed to the servo cylinder 71 through the oil line 70. This moves the piston 72 in right hand direction causing the wicket gates 62 to move in the closing direction. The downward movement of the plunger 63 is followd by the lowering of the return arm 98, which forces down the sleeve 59 of the oil pressure distributor valve. As a result, relative displacement between the sleeve 59 and the plunger 58 occurs to isolate the oil connection 68 from the discharge side of the oil pressure distributor valve. When the oil connection 68 is isolated from the discharge side of the oil pressure distributor valve, the sleeve 59 is no longer forced down by the arm 98 and thus stops its downward movement. Downward movement and stopping of the sleeve 59 successively take place resulting in repeated stepwise lowering of the sleeve 59.

The movement in the right hand direction of the piston 72 is transmitted through the return post 73 and the wire 75 to the return sheave 76 to rotate the latter in the counter-clockwise direction together with the shaft 1 and the pulley 77. This counter-clockwise rotation of the pulley 77 causes the corresponding counter-clcokwise rotation of the return cam 81 through the wire 78, pulley 79 and the return shaft 80, and the counter-clockwise rotation of the return cam 81 in turn causes the upward movement of the link 82 against the bias force of the spring 83. Thus, the intermediate portion of the horizontal lever 57 is raised causing the right end of the lever 57 and thus the plunger 58 to move upwardly. As a result, the plunger 58 which has been lowered is returned to its original neutral position as illustrated. Opening degree of the wicket gates 62 is thus determined dependent upon the input signal transmitted to the link 56.

As explained above, the closing action of the wicket gates 62 is caused by the movement of the piston 72 in the servo cylinder 71 toward the right, and this rightward movement of the piston 72 causes the counter-clockwise rotation of the return sheave 76 as well as the shaft 1. The counter-clockwise rotation of the shaft 1 causes the upward movement A of the left end of the horizontal lever 28 of the apparatus section I—I, thereby causing the sleeve 43 of the bypass valve 47 to move rightwardly to increase the opening degree of the latter, as described hereinbefore with reference to FIG. 1. It is herein to be noted that the signal transmitted from the shaft 1 to the left end of the horizontal lever 28 through the link mechanism $L_1$ corresponds to a positional signal directly reflecting the rotated angular position or rotational displacement of the shaft 1, and the bypass valve 47 of FIG. 1 is controlled by only this positional signal.

With the structure of FIG. 2, a differential signal indicating the differential value of the displacement of the piston 72 in the servo cylinder 71, which is closely associated with the differential value of the rotational displacement of the shaft 1, is transmitted to the left end of the horizontal lever 28 in addition to the positional signal. The differential value of the displacement is a differentiation with respect to time to produce a changing rate of the position, for example velocity of the piston 72. This differential signal is transmitted thereto by the link mechanism $L_2$. As described hereinbefore, when the link 56 is moved downwardly, the oil flows through the oil line 70 into the servo cylinder 71, thereby moving the piston 72 toward the right to close the wicket gates 62. The rate of oil flowing into the servo cylinder 71 through the oil line 70 is controlled responsive to the movement of the plunger 63 passing across an end of the oil line 70 open into the main oil pressure distributor valve 64, and the moving velocity of the piston 72 in the servo cylinder 71 is proportional to the oil flow rate into the cylinder 71. Further, the moving velocity of the piston 72 is the differential value of the displacement of the latter. Thus, the movement of the plunger 63 in the main pressure oil distributor valve 64 indicates the differentiated displacement of the piston 72.

When the plunger 63 is moved downwardly as mentioned above, the link 61 of the link mechanism $L_2$ and thus the left end of the lever 84 is correspondingly lowered to permit the right end of the lever 84 to move upwardly together with the link 85 and the left end of the lever 86. This causes the right end of the lever 86, link 88 and the left end of the lever 26 to move downwardly, thereby causing the right end of the lever 26 to move upwardly together with the link 27. Consequently, the left end of the lever 28 is moved upwardly. It is apparent that the follow-up or response characteristics of the opening action of the bypass valve 47 responsive to the closing action of the wicket gates 62 is significantly improved by the transmission of the differential signal in addition to the positional signal.

The opening action of the wicket gates 62 and the corresponding closing action of the bypass valve 47 are effected in the similar manner. When the link 56 is lowered by an input signal transmitted from the governor, the plunger 58 of the oil pressure distributor valve is moved upwardly to supply pressurized oil through the oil line 68 into the pilot valve cylinder 64' of the main oil pressure distributor vavle 64. Thus, the plunger 63 is raised to cause an oil flow through the oil line 69 into the servo cylinder 71, thereby moving the piston 72 toward the left to open the wicket gates 62. The leftward movement of the piston 72 causes the clockwise rotation of the shaft 1, cam 2, return sheave 76, pulleys 77 and 79, return shaft 80 and return cam 81, and the clockwise rotation of the return cam 81 in turn causes the downward movement of the link 82 with the aid of the bias force of the spring 83. Thus, the intermediate portion of the horizontal lever 57 is lowered, thereby causing the right end of the lever 57 to move downwardly together with the plunger 58. The downward movement of the plunger 58 is followed by the downward movement of the plunger 63. The plunger 63 is thus returned to its original neutral position illustrated, and the wicket gates 62 are held stationary to have the opening degree responsive to the input signal transmitted from the governor.

During the opening action of the wicket gates, the link mechanism $L_1$ detects the rotation of the shaft 1 and transmits the corresponding positional signal, which indicates the opening action of the wicket gates, to the left end of the horizontal lever 28, while the link mechanism $L_2$ detects the movement of the plunger 63 and transmits the corresponding differential signal, which indicates the differentiated opening action of the wicket gates, to the left end of the lever 28. It is apparent that the positional and differential signals press the left end of the lever 28 downwardly, thereby moving the bypass valve 47 toward the closed position. The transmission of the differential signal in addition to the positional signal improves the follow-up characteristics of the closing action of the bypass valve 47 responsive to the opening action of the wicket gates.

As can be understood from the foregoing description, the link mechanism $L_2$ and the associated parts advantageously transmit the differential signal to the bypass valve 47 during the transient operating conditions of the control apparatus in which the opening or closing action of the wicket gates 62 is continued. However, there is the fear that the link mechanism $L_2$ badly affects the control characteristics of the control apparatus when the primary control unit is held stationary in a predetermined operative position, i.e., when the wicket gates are maintained to have a constant opening degree. For example, in the case where the operation of the water-turbine is stopped and thus the wicket gates 62 are maintained in their fully closed position having an opening degree of zero, it is desirable to minimize the water leakage through gaps between the adjacent wicket gates. To this end, it is preferred to constantly apply an oil pressure on the left hand side of the piston 72 in the servo cylinder 71, thereby applying squeezing pressure to the wicket gates adjacent to each other while the wicket gates are maintained in the fully closed position and thus the piston 72 is held stationary at the rightmost postion in the servo cylinder 71. This is achieved by maintaining the plunger 63 of the main oil pressure distributor valve 64 at a position where the downward movement of the stopper 67, which is movable with the plunger 63, is restricted by the nuts 66 and 66', thereby permitting an amount of pressurized oil supply into the servo cylinder 71 through the oil line 70. In this case, however, the link mechanism $L_2$ detects the downward displacement of the plunger 63 and transmits the corresponding signal to the left end of the horizontal lever 28, irrespective of the fact that the wicket gates are held stationary. It is to be noted that, when the wicket gates are held stationary, the differential signal indicating the moving velocity of the wicket gates should be zero.

The differential signal detected by the link mechanism $L_2$ while the wicket gates are held stationary in the fully closed position is transmitted to the horizontal lever 28 to cause the left end thereof to move upwardly. Thus, the opening degree of the bypass valve 47 is unduly increased beyond the value properly reflecting the fully closed position of the wicket gates. More particularly, in the case where the apparatus section I—I is set to operate in a mode which maintains the total water discharge through the wicket gates and the bypass valve constant, the bypass valve is opened beyond the proper opening degree reflecting the opening degree, zero, of the wicket gates. Further, when the apparatus section I—I is set to operate in a water saving mode to slowly close the bypass valve after the stable condition of the bypass valve is reached to have the opening degree reflecting the opening degree of the wicket gates, there is caused the disadvantage that the bypass valve cannot be fully closed after the predetermined opening degree of the wicket gates is reached.

The solenoid valve 90, reset cylinder 93 and the associated parts are provided for obviating the abovediscussed disadvantages encountered with the provision of the link mechanism $L_2$ for the differential signal transmission. As previously described, the chamber defined in the cylinder 93 at the underside of the piston 92 is filled with pressurized oil supplied through the oil line 100 during ordinary operation of the control apparatus, so that the piston 92 and thus the link 95 is held in the upward position as illustrated. When the wicket gates 62 are held stationary in the fully closed position and the plunger 63 is lowered below the illustrated neutral position, both the first and second contacts $S_1$ and $S_2$ (FIG. 3) are opened to de-energize the solenoid valve 90. Thus, the pressurized oil is discharged from the chamber in the cylinder 93 at the underside of the piston 92, so that the piston 92 and thus the link 95 are lowered with the aid of the biasing force of the spring 94, and the intermediate portion of the lever 84 connected to the link 95 is lowered, thereby causing the right end of the lever 84 to move downwardly. With this downward movement of the right end of the lever 84, the upward movement of the right end thereof which has been caused by the downward displacement of the plunger 63 in the main oil pressure distributor valve 64 is cancelled. Thus, the differential signal transmitted to the horizontal lever 28 is cancelled. It is to be noted that the upward displacement of the right end of the lever 84 which is caused while the wicket gates are held in the fully closed position should be identical in amount with the downward displacement of the right end of the same lever 84 which is caused by the downward movement of the piston 92 in the reset cylinder 93, so as to properly reset the differential signal. This is achieved, for example, by properly designing the moving stroke of the piston 92 in close correlation with the amount of displacement of the plunger 63 caused while the wicket gates are held stationary in the fully closed position. It is to be noted that the resetting of the differential signal is often desired when the primary control unit is in a limit or terminal operative position, such as the fully closed position of the wicket gates.

As will be understood from the foregoing description, the control apparatus of the present invention improves the follow-up characteristics of the operation of the secondary control unit responsive to the operation of the primary control unit by controlling the operation of the secondary control unit with both the positional and differential signals, and the differential signal can be positively resetted when desired. In the illustrated embodiment, the resetting of the differential signal may be easily positively effected with the simple structure including solenoid valve, reset cylinder and piston contained therein.

Although the invention has been described with reference to FIGS. 1 to 3, the invention is not limited to the illustrated embodiment. For example, the control apparatus of the invention may be modified to include primary and secondary control units composed of wicket gates and runner blades, respectively, of the waterturbine. Similarly, the invention may be modified to use with Kaplan turbine or tubular turbine for controlling operation of its wicket gates and runner vanes. In the latter case, the wicket gates and runner vanes constitute primary and secondary control units, respectively. Also the control apparatus of the invention may be used with Pelton wheel for controlling the primary control unit composed of deflector and the secondary control unit composed of needle.

What is claimed is:

1. In a control apparatus of the type including a primary control unit, including wicket gates of a hydraulic turbine, capable of taking variable operative positions, and a secondary control unit, including a bypass valve operable to control an amount of bypass flow in response to the opening and closing of said wicket gates operable in accordance with the operative positions of said primary control unit, said apparatus comprising:
    first signal transmitting means for detecting the operative position of said primary control unit and transmitting the corresponding positional signal to said secondary control unit,
    said primary control unit including a power amplification servo-motor at the final stage thereof,
    second signal transmitting means for detecting the changing rate with respect to time of the operative position of said primary control unit and transmitting the corresponding differential signal to said secondary control unit,
    said second signal transmitting means not detecting exact operative position of said final stage servo-motor but detecting motion of its command signal yielding or generating unit upstream of said servo-motor, and
    means for modifying said differential signal when it is detected that the motion of said servo-motor of said primary control unit is mechanically or hydraulically restricted.

2. A control apparatus as set forth in claim 1, wherein said differential signal modifying means resets said differential signal when the stroke of said final stage servo-motor of said primary control unit is physically restricted.

3. A control apparatus as set forth in claim 2, wherein said primary control unit includes hydraulic piston-cylinder means the piston of which is movable in the cylinder thereof and pressure distributor valve means hydraulically connected to said piston-cylinder means and having a plunger movable in response to signal from said command signal yielding unit, to control hydraulic fluid flow into and out of said cylinder, thereby to cause the movement of said piston, said first signal transmitting means being operatively connected to said piston to detect the movement of the latter and transmitting the corresponding signal to said secondary control unit, while said second signal transmitting means being operatively connected to said plunger to detect the movement of the latter and transmitting the corresponding signal to said secondary control unit.

4. A control apparatus as set forth in claim 3, wherein said differential signal modifying means is operable to reset said differential signal when it is detected that said piston is held stationary in an end position of the moving stroke thereof and that said plunger is displaced from the position in which said second signal transmitting means transmits the differential signal of zero.

5. A control apparatus for a hydraulic turbine comprising:
   wicket gates control means for controlling the opening degree of wicket gates of said hydraulic turbine,
   bypass control means,
   first signal transmitting means for detecting the opening degree of said wicket gates and transmitting the corresponding signal to said bypass control means,
   second signal transmitting means for detecting position of a pressure distributor valve plunger for said wicket gates and transmitting the corresponding signal to said bypass control means,
   said bypass control means being operable to control an amount of bypass flow in response to said signals transmitted from said first and second signal transmitting means, and
   reset means for automatically resetting said signal from said second signal transmitting means when it is detected that said wicket gates control means is operated to hold said wicket gates at a predetermined opening degree.

6. A control apparatus as set forth in claim 5, wherein said wicket gates control means includes hydraulic piston-cylinder means, the piston of which is operatively connected to said wicket gates and reciprocally movable in the cylinder thereof to open and close said wicket gates, and pressure distributor valve means hydraulically connected to said piston-cylinder means and having a plunger movable in response to an input signal to control hydraulic fluid flow into and out of said cylinder to thereby cause the reciprocal movement of said piston, said first signal transmitting means being operatively connected to said piston to detect the movement of the latter and transmitting the corresponding signal to said bypass control means, while said second signal transmitting means being operatively connected to said plunger to detect the movement of the latter and transmitting the corresponding signal to said bypass control means.

7. A control apparatus as set forth in claim 6, wherein said reset means is operable to reset said signal from said second signal transmitting means when it is detected that said wicket gates are held stationary in the fully closed position and that said plunger is displaced from the position in which said second signal transmitting means transmits the signal of zero.

8. A control apparatus as set forth in claim 7, wherein said reset means includes resetting piston-cylinder means, the piston of which is operatively connected to said second signal transmitting means and reciprocally movable in the cylinder thereof, and a solenoid valve hydraulically connected to said resetting piston-cylinder means to control the reciprocal movement of the latter piston, said solenoid valve being operable to cause the movement of the latter piston in a direction to reset said signal from said second signal transmitting means only when it is detected that said wicket gates are held stationary in the fully closed position and that said plunger is displaced from the position in which said second signal transmitting means transmits the signal of zero.

9. A control apparatus as set forth in claim 8, wherein said solenoid valve includes a solenoid connected in series with a switch circuit incorporating therein first and second contacts connected in parallel with each other, said first contact being opened only when said wicket gates are in the fully closed position, while said second contact being opened only when said plunger is displaced from the position in which said second signal transmitting means transmits the signal of zero.

10. A control apparatus as set forth in claim 6, 7, 8 or 9, wherein said first signal transmitting means includes a link mechanism having one end connected to said wicket gates and the other end connected to said bypass control means, while said second signal transmitting means includes another link mechanism having one end connected to said plunger and the other end connected to said bypass control means.

11. A control apparatus in combination with a rotary kinetic fluid machine having a rotary drive shaft, a plurality of blades mounted peripherally around and on said drive shaft, a working fluid inlet leading to said blades, and a working fluid outlet leading from said blades:
   a primary control unit including valve means for changing the working fluid flow through said machine, and being capable of taking variable operative positions, and a secondary control unit including bypass valve means operable to control an amount of bypass flow of working fluid around said primary control unit valve means in response to the opening and closing operative positions of said primary control unit valve means;
   first signal transmitting means for detecting the operative position of said primary control unit and transmitting the corresponding positional signal to said secondary control unit,
   said primary control unit including a power amplification servo-motor at the final stage thereof,
   second signal transmitting means for detecting the changing rate with respect to time of the operative position of said primary control unit and transmitting the corresponding differential signal to said secondary control unit,
   said second signal transmitting means not detecting exact operative position of said final stage servo-motor but detecting motion of its command signal yielding or generating unit upstream of said servo-motor, and
   means for modifying said differential signal when it is detected that the motion of said servo-motor of said primary control unit is mechanicaly or hydraulically restricted.

12. The apparatus of claim 11, wherein said rotary kinetic fluid machine is a turbine.

13. The combination of claim 12, wherein said first signal transmitting means detects the opening degree of said primary control unit valve means and transmits the corresponding signal to said signal control unit to control the opening degree of said valve means of said secondary control unit;

said primary control unit further including a pressure distribution valve means controlling the flow of pressurized fluid to said final stage servo-motor;

said second signal transmitting means detecting the opening position of said distribution valve means and transmitting the corresponding signal to said bypass control valve means;

said bypass control valve means being operable to control the amount of bypass fluid flow in response to both said signals transmitted from said first and second signal transmitting means; and reset means for automatically resetting said signal from said second signal transmitting means when it is detected that said primary control unit valve means is at a fixed opening amount.

14. The combination of claim 11, wherein said first signal transmitting means detects the opening degree of said primary control unit valve means and transmits the corresponding signal to said secondary control unit to control the opening degree of said valve means of said secondary control unit;

said primary control unit further including a pressure distribution valve means controlling the flow of pressurized fluid to said final stage servo-motor;

said second signal transmitting means detecting the opening position of said distribution valve means and transmitting the corresponding signal to said bypass control valve means;

said bypass control valve means being operable to control the amount of bypass fluid flow in response to both said signals transmitted from said first and second signal transmitting means; and reset means for automatically resetting said signal from said second signal transmitting means when it is detected that said primary control unit valve means is at a fixed opening amount.

15. The combination of claim 14, wherein said reset means responds to the fixed position of said primary unit control valve means that corresponds to the stationary fully closed position and said distributor valve means is in a position supplying fluid to said servo-motor tending to further close said primary control unit valve means.

16. The combination of claim 13, wherein said reset means responds to the fixed position of said primary unit control valve means that corresponds to the stationary fully closed position and said distributor valve means is in a position supplying fluid to said servo-motor tending to further close said primary control unit valve means.

17. The combination of claim 1, wherein said first signal transmitting means detects the opening degree of said wicket gates and transmits the corresponding signal to said secondary control unit to control the opening degree of said bypass valve of said secondary control unit;

said primary control unit further including a pressure distribution valve means controlling the flow of pressurized fluid to said final stage servo-motor;

said second signal transmitting means detecting the opening position of said distribution valve means and transmitting the corresponding signal to said bypass control valve;

said bypass control valve being operable to control the amount of bypass fluid flow in response to both said signals transmitted from said first and second signal transmitting means; and reset means for automatically resetting said signal from said second signal transmitting means when it is detected that said wicket gates are at a fixed opening amount.

18. The combination of claim 17, wherein said reset means responds to the fixed position of said primary unit control valve means that corresponds to the stationary fully closed position and said distributor valve means is in a position supplying fluid to said servo-motor tending to further close said wicket gates.

* * * * *